US007225219B2

(12) United States Patent
Giacomini et al.

(10) Patent No.: US 7,225,219 B2
(45) Date of Patent: May 29, 2007

(54) DISTRIBUTED CACHING ARCHITECTURE FOR COMPUTER NETWORKS

(75) Inventors: Peter Joseph Giacomini, South Plainfield, NJ (US); Walter Michael Pitio, Morganville, NJ (US); Hector Francisco Rodriguez, Middletown, NJ (US); Donald David Shugard, Middletown, NJ (US)

(73) Assignee: Broadspider Networks, Inc., Middletown, NJ (US)

( * ) Notice: Subject to any disclaimer, the term of this patent is extended or adjusted under 35 U.S.C. 154(b) by 1181 days.

(21) Appl. No.: 09/725,732

(22) Filed: Nov. 29, 2000

(65) Prior Publication Data

US 2002/0103848 A1 Aug. 1, 2002

(51) Int. Cl.
*G06F 15/16* (2006.01)

(52) U.S. Cl. ...................... 709/200; 713/154; 713/177; 713/190

(58) Field of Classification Search ................ 709/201, 709/206, 217, 227, 223, 200, 203, 213, 226, 709/245, 248; 707/7, 10, 101, 2, 103, 203, 707/102, 4; 714/49; 711/122, 216, 164, 711/218; 713/187, 176, 190, 177, 165; 341/51; 710/21; 717/173; 718/100, 104
See application file for complete search history.

(56) References Cited

U.S. PATENT DOCUMENTS 4,714,996 A * 12/1987 Gladney et al. ............ 707/203
5,153,591 A * 10/1992 Clark .......................... 341/51
5,406,278 A * 4/1995 Graybill et al. ............... 341/51
5,428,774 A * 6/1995 Takahashi et al. .......... 707/101
5,542,087 A * 7/1996 Neimat et al. ................ 707/10
5,559,979 A * 9/1996 Shiga et al. ................ 711/218
5,761,531 A * 6/1998 Ohmura et al. ............... 710/21
5,781,629 A * 7/1998 Haber et al. ................ 713/177
5,802,590 A * 9/1998 Draves ....................... 711/164
5,860,153 A * 1/1999 Matena et al. .............. 711/216
5,924,116 A 7/1999 Aggarwal et al.
5,974,421 A * 10/1999 Krishnaswamy et al. ...................... 707/103 R
5,987,454 A * 11/1999 Hobbs ........................... 707/4
6,014,730 A * 1/2000 Ohtsu ......................... 711/170

(Continued)

OTHER PUBLICATIONS

URL forwarding and compression in adaptive Web caching; IEEE, vol. 2 , Mar. 26-30, 2000.*

(Continued)

*Primary Examiner*—Thong Vu
(74) *Attorney, Agent, or Firm*—DeMont & Breyer, LLC

(57) ABSTRACT

A distributed caching technique for use in computer networks is disclosed. The illustrative embodiment is particularly advantageous in computer networks that comprises a hierarchical topology because it removes some of the computational tasks associated with caching away from the network nodes that act as caches to other network nodes that are less burdened with computational tasks. Furthermore, some embodiments of the present invention use hash tables to facilitate the storage and retrieval of cached resources. The illustrative embodiment of the present invention comprises: hashing at a first processor a first resource identifier to create a hash key, wherein the first resource identifier identifies a first resource; transmitting from the first processor to a second processor the hash key and a request for the first resource; and receiving at the first processor a second resource in response to the transmission of the hash key and the request for the first resource from the first processor to the second processor.

22 Claims, 10 Drawing Sheets

RESOURCE IDENTIFIER
HASH FUNCTION
HASH KEY
FIRST HASH KEY
SECOND HASH KEY

U.S. PATENT DOCUMENTS

| | | | | |
|---|---|---|---|---|
| 6,061,741 | A * | 5/2000 | Murphy et al. | 709/248 |
| 6,084,877 | A * | 7/2000 | Egbert et al. | 370/389 |
| 6,135,646 | A * | 10/2000 | Kahn et al. | 709/217 |
| 6,144,983 | A * | 11/2000 | Klots et al. | 718/104 |
| 6,151,676 | A * | 11/2000 | Cuccia et al. | 713/176 |
| 6,151,708 | A * | 11/2000 | Pedrizetti et al. | 717/173 |
| 6,212,521 | B1 * | 4/2001 | Minami et al. | 707/10 |
| 6,230,231 | B1 * | 5/2001 | DeLong et al. | 711/3 |
| 6,253,225 | B1 * | 6/2001 | Nakahara et al. | 718/100 |
| 6,279,007 | B1 * | 8/2001 | Uppala | 707/101 |
| 6,289,375 | B1 * | 9/2001 | Knight et al. | 709/217 |
| 6,292,880 | B1 * | 9/2001 | Mattis et al. | 711/216 |
| 6,351,772 | B1 * | 2/2002 | Murphy et al. | 709/227 |
| 6,366,950 | B1 * | 4/2002 | Scheussler et al. | 709/206 |
| 6,381,601 | B1 * | 4/2002 | Fujiwara et al. | 707/7 |
| 6,405,315 | B1 * | 6/2002 | Burns et al. | 713/190 |
| 6,415,280 | B1 * | 7/2002 | Farber et al. | 707/2 |
| 6,421,662 | B1 * | 7/2002 | Karten | 707/3 |
| 6,449,657 | B2 * | 9/2002 | Stanbach et al. | 709/245 |
| 6,507,847 | B1 * | 1/2003 | Fleischman | 707/101 |
| 6,516,320 | B1 * | 2/2003 | Odom et al. | 707/101 |
| 6,532,542 | B1 * | 3/2003 | Thomlinson et al. | 713/187 |
| 6,557,024 | B1 * | 4/2003 | Saito et al. | 709/201 |
| 6,557,102 | B1 * | 4/2003 | Wong et al. | 713/176 |
| 6,567,817 | B1 * | 5/2003 | VanLeer | 707/102 |
| 6,754,662 | B1 * | 6/2004 | Li | 707/101 |
| 6,785,714 | B1 * | 8/2004 | Thompson et al. | 709/213 |
| 6,807,632 | B1 * | 10/2004 | Carpentier et al. | 713/165 |
| 6,823,377 | B1 * | 11/2004 | Wu et al. | 709/223 |
| 6,898,618 | B1 * | 5/2005 | Slaughter et al. | 709/203 |
| 6,965,992 | B1 * | 11/2005 | Joseph et al. | 713/153 |
| 2002/0049760 | A1 * | 4/2002 | Scott et al. | 707/10 |
| 2002/0059364 | A1 * | 5/2002 | Coulthard et al. | 709/203 |
| 2002/0083178 | A1 * | 6/2002 | Brothers | 709/226 |

OTHER PUBLICATIONS http://iep.water.ca.gov/cgi/cgi-bin/dss/bin/s...p/oobr/hasht.el.*

Efficient Parallel Classification Using Dimensional Aggregates—Sanjay Goil Alok (1999); www.cs.rpi.edu/~zaki/WKDD99/goil.ps.*

Linear Spiral Hashing for Expansible Files, IEEE 1999.*

A Semantic Search Algorithm for Peer-to-Peer Open.. —Zhou, Dialani, De.. ; www.isi.edu/~stefan/SemPGRID/proceedings/3.pdf.*

New Possibilities Offered by IPv6—Loukola And Skytt ; www.hut.fi/~mloukola/pub7/p1.pdf.*

Privacy And Accountability In Certificate Systems—Aura, Ellison (2000) www.tcs.hut.fi/Publications/papers/aura/HUT-TCS-A61.ps.*

Consistent Hashing and Random Trees: Distributed.. —Karger, Lehman.. (1997) theory.lcs.mit.edu/~karger/Papers/web.ps.g.*

Reducing Network Latency Using Subpages in a Global Memory..— Herve Jamrozik (1996) ftp.cs.washington.edu/tr/1996/07/UW-CSE-96-07-03.PS.Z.*

Managing Server Load in Global Memory Systems—Geoffrey Voelker (1997) 128.95.4.112/homes/levy/gms/sigmet97.ps.*

Cache-Rings for Memory Efficient Isosurface Construction—Weinstein (1997) www.cs.utah.edu/~sci/publications/cache-rings/cache-rings.ps.gz.*

Dynamic Perfect Hashing: Upper and Lower Bounds—Dietzfelbinger, Karlin.. (1990) www.uni-paderbom.de/fachbereich/AG/agmadh/WWW/documents/../../PapersPostscript/DynamicPerfHashing_SICOMP.ps.*

Performance of hashing-based schemes for Internet load balancing INFOCOM 2000. Nineteenth Annual Joint Conference of the IEEE Computer and Communications Societies. Proceedings. IEEE vol. 1, Mar. 26-30, 2000 pp. 332-341 vol. 1.*

Trading packet headers for packet processing□□Chandranmenon, G.P.; Varghese, G.; Networking, IEEE/ACM Transactions on vol. 4, Issue 2, Apr. 1996 pp. 141-152.*

Indexing for multiversion locking: alternatives and performance evaluation□□Bober, P.M.; Carey, M.J.; Knowledge and Data Engineering, IEEE Transactions on□□vol. 9, Issue 1, Jan.-Feb. 1997 pp. 68-84.*

* cited by examiner

400
NODE
401
411
NODE
NODE
412
413
NODE
421
NODE
NODE
NODE
NODE
NODE
422
423
424
425
NODE
431
NODE
432
NODE
433

500
NODE
510-1
501
TO/FROM FILIAL NODE 1
Rx
Tx
511-1
510-2
TO/FROM FILIAL NODE 2
Rx
Tx
511-2
513
Tx
Rx
514
PROCESSOR
TO/FROM PARENTAL NODE (IF ANY)
510-n
TO/FROM FILIAL NODE n
Rx
Tx
511-n
MEMORY
503
CACHE
502

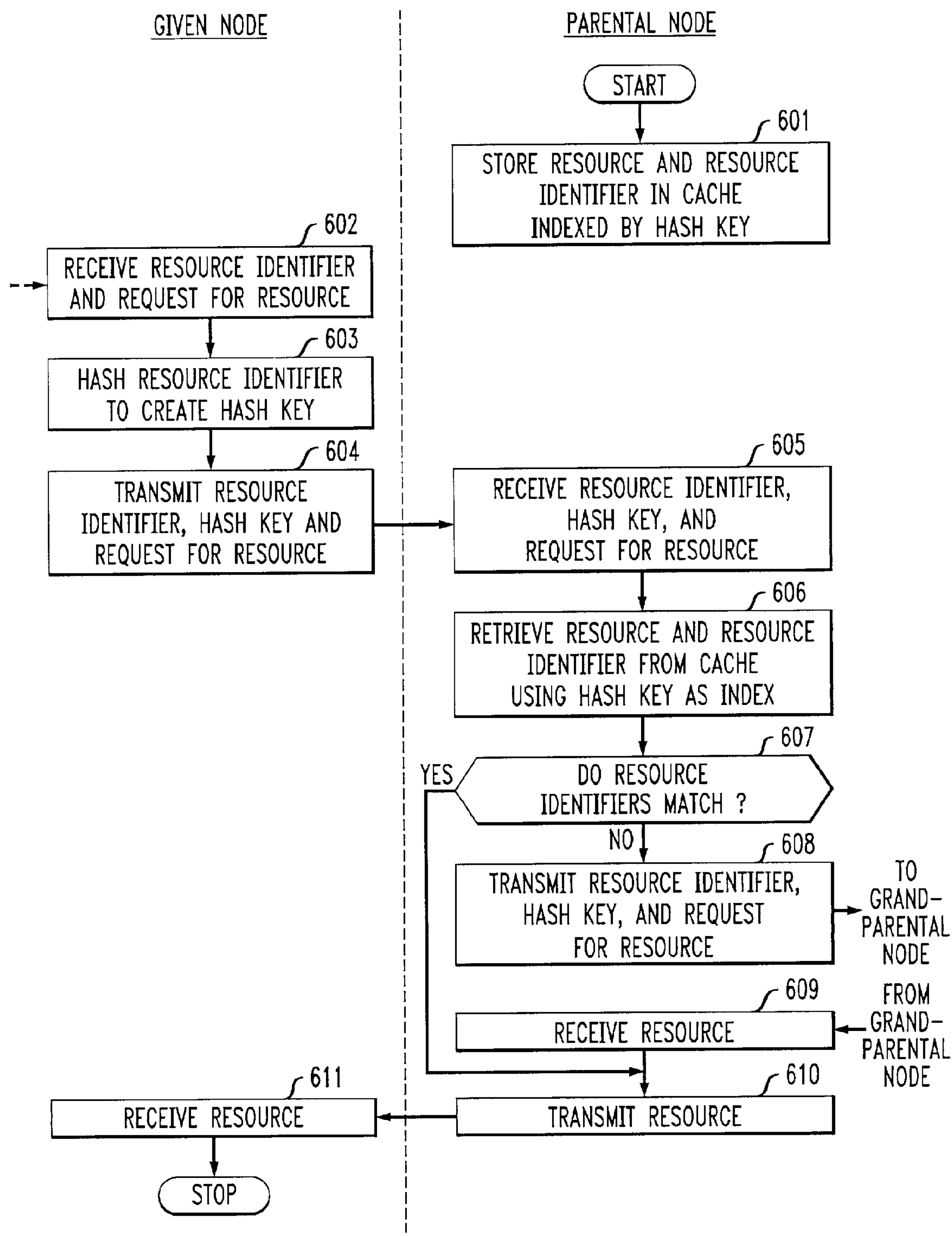

FIG. 6
GIVEN NODE
PARENTAL NODE
START
601
STORE RESOURCE AND RESOURCE IDENTIFIER IN CACHE INDEXED BY HASH KEY
602
RECEIVE RESOURCE IDENTIFIER AND REQUEST FOR RESOURCE
603
HASH RESOURCE IDENTIFIER TO CREATE HASH KEY
604
TRANSMIT RESOURCE IDENTIFIER, HASH KEY AND REQUEST FOR RESOURCE
605
RECEIVE RESOURCE IDENTIFIER, HASH KEY, AND REQUEST FOR RESOURCE
606
RETRIEVE RESOURCE AND RESOURCE IDENTIFIER FROM CACHE USING HASH KEY AS INDEX
607
DO RESOURCE IDENTIFIERS MATCH ?
YES
NO
608
TRANSMIT RESOURCE IDENTIFIER, HASH KEY, AND REQUEST FOR RESOURCE
TO GRAND-PARENTAL NODE
609
RECEIVE RESOURCE
FROM GRAND-PARENTAL NODE
610
TRANSMIT RESOURCE
611
RECEIVE RESOURCE
STOP

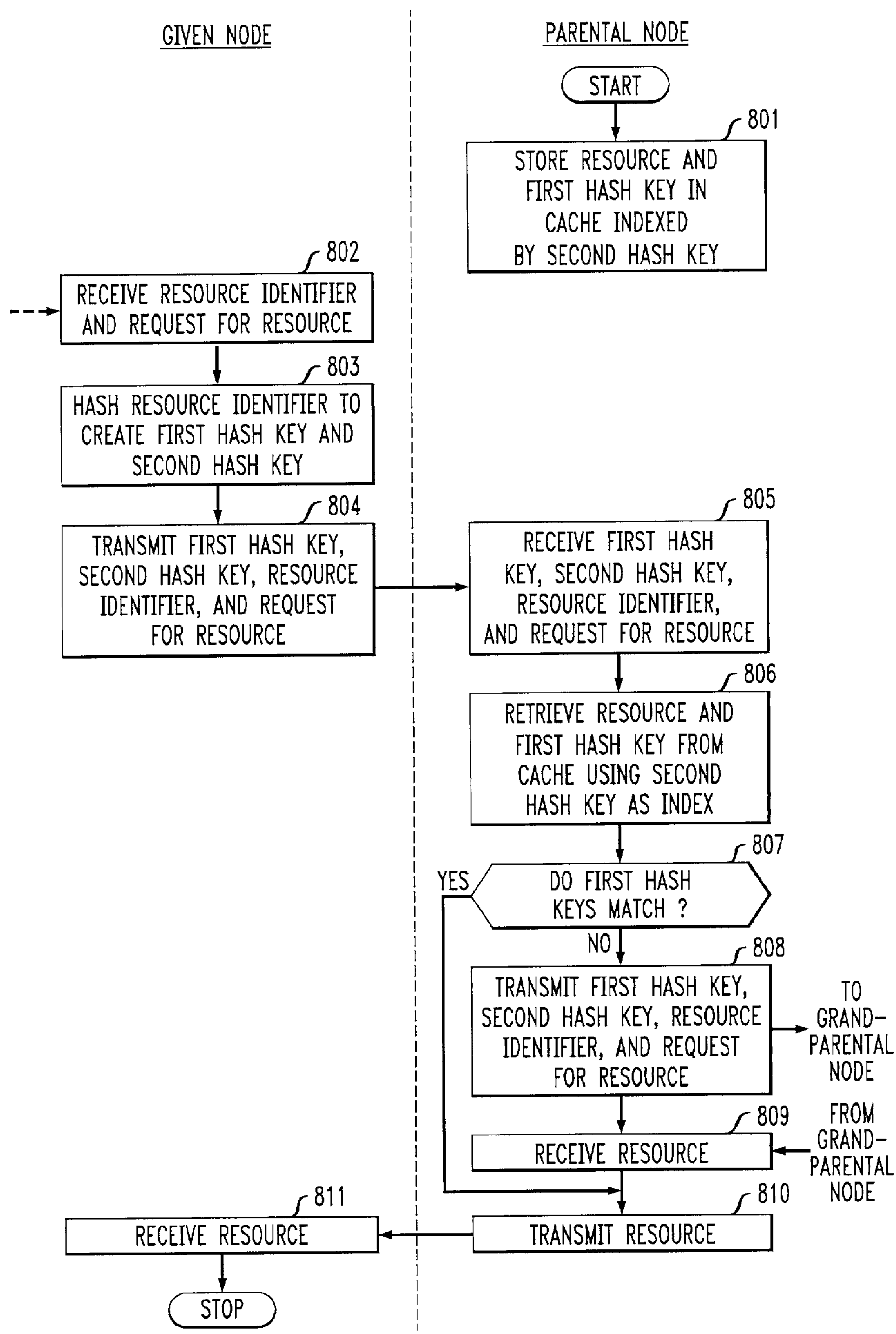
FIG. 8
GIVEN NODE
PARENTAL NODE
START
801
STORE RESOURCE AND FIRST HASH KEY IN CACHE INDEXED BY SECOND HASH KEY
802
RECEIVE RESOURCE IDENTIFIER AND REQUEST FOR RESOURCE
803
HASH RESOURCE IDENTIFIER TO CREATE FIRST HASH KEY AND SECOND HASH KEY
804
TRANSMIT FIRST HASH KEY, SECOND HASH KEY, RESOURCE IDENTIFIER, AND REQUEST FOR RESOURCE
805
RECEIVE FIRST HASH KEY, SECOND HASH KEY, RESOURCE IDENTIFIER, AND REQUEST FOR RESOURCE
806
RETRIEVE RESOURCE AND FIRST HASH KEY FROM CACHE USING SECOND HASH KEY AS INDEX
807
DO FIRST HASH KEYS MATCH ?
YES
NO
808
TRANSMIT FIRST HASH KEY, SECOND HASH KEY, RESOURCE IDENTIFIER, AND REQUEST FOR RESOURCE
TO GRAND-PARENTAL NODE
809
RECEIVE RESOURCE
FROM GRAND-PARENTAL NODE
810
TRANSMIT RESOURCE
811
RECEIVE RESOURCE
STOP

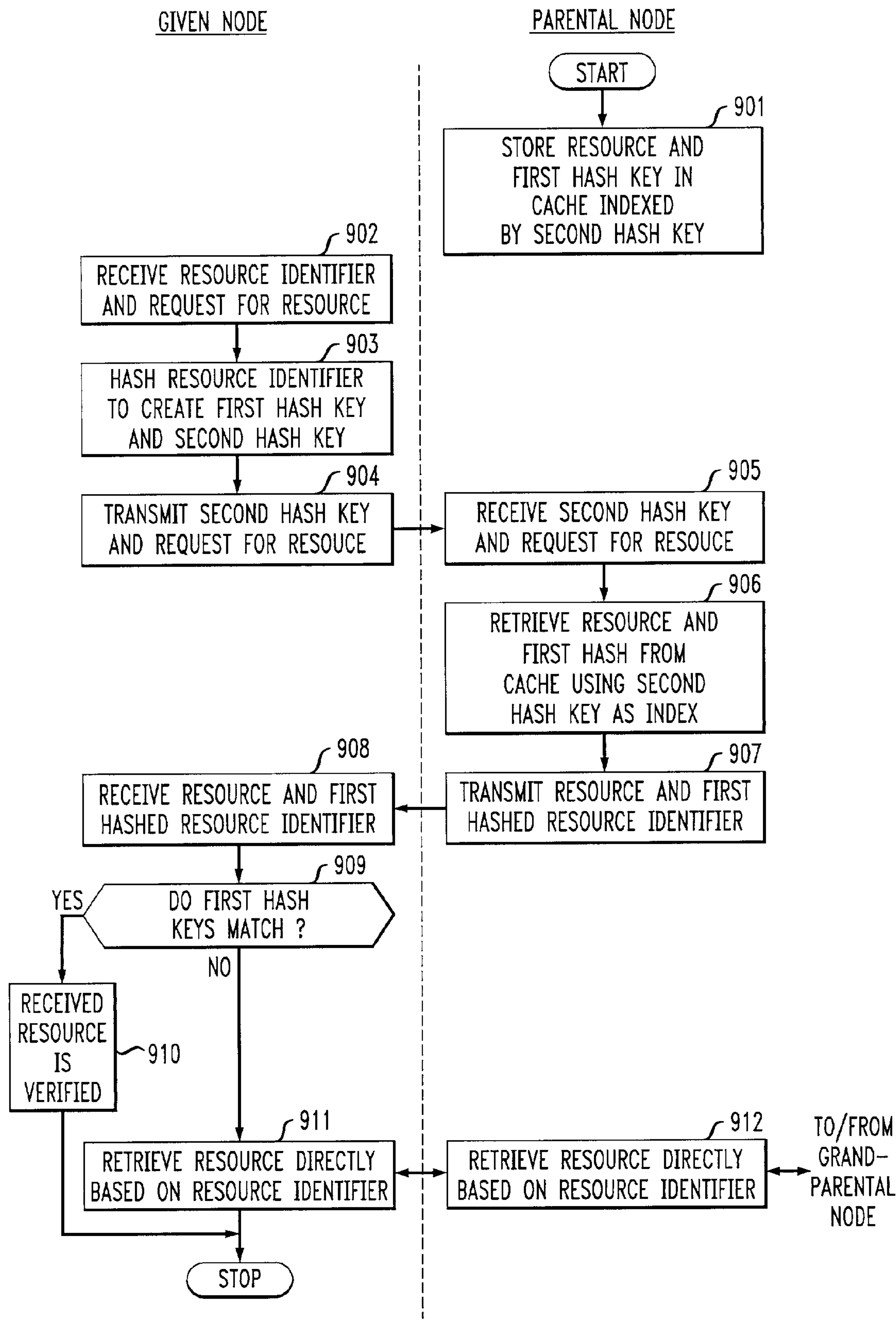
FIG. 9
GIVEN NODE
PARENTAL NODE
START
901
STORE RESOURCE AND FIRST HASH KEY IN CACHE INDEXED BY SECOND HASH KEY
902
RECEIVE RESOURCE IDENTIFIER AND REQUEST FOR RESOURCE
903
HASH RESOURCE IDENTIFIER TO CREATE FIRST HASH KEY AND SECOND HASH KEY
904
TRANSMIT SECOND HASH KEY AND REQUEST FOR RESOUCE
905
RECEIVE SECOND HASH KEY AND REQUEST FOR RESOUCE
906
RETRIEVE RESOURCE AND FIRST HASH FROM CACHE USING SECOND HASH KEY AS INDEX
907
TRANSMIT RESOURCE AND FIRST HASHED RESOURCE IDENTIFIER
908
RECEIVE RESOURCE AND FIRST HASHED RESOURCE IDENTIFIER
909
DO FIRST HASH KEYS MATCH ?
YES
NO
RECEIVED RESOURCE IS VERIFIED
910
911
RETRIEVE RESOURCE DIRECTLY BASED ON RESOURCE IDENTIFIER
912
RETRIEVE RESOURCE DIRECTLY BASED ON RESOURCE IDENTIFIER
TO/FROM GRAND-PARENTAL NODE
STOP

DISTRIBUTED CACHING ARCHITECTURE FOR COMPUTER NETWORKS

REFERENCE TO RELATED APPLICATIONS

This application is related to U.S. patent application Ser. No. 09/725,737, entitled "Method and Apparatus for Economical Cache Population," filed on 29 Nov. 2000, which is incorporated by reference.

FIELD OF THE INVENTION

The present invention relates to computer networks in general, and, more particularly, to techniques for caching resources at one node in a computer network for use by another node in the network.

BACKGROUND OF THE INVENTION

When a user of the World Wide Web requests a Web page, the user must wait until the page is available on his or her data processing system (e.g., computer, etc.) for viewing. In general, this wait occurs because the request for the Web page must traverse the Internet from the user's data processing system to the data processing system that is the source of the page, the request must be fulfilled, and the requested page must travel back to the user's system. If the Internet is congested or the data processing system that is the source of the page is overwhelmed with many concurrent requests for pages, the wait can be considerably long.

To shorten this wait, special data processing systems are deployed throughout the Internet that expedite the delivery of some Web pages. Some of these data processing systems expedite the delivery of Web pages by functioning as cache memories, which are also known as "caches." For the purpose of this specification, a "cache" is defined as a cache memory. For example, a cache stores commonly requested Web pages and thereafter enables requests for those pages to be intercepted and fulfilled from the cache without retrieval form the principal memory. This expedites the delivery of the Web page in two ways. First, a cache eliminates the need for the request to travel all of the way to the system that is the ultimate source of the page, and, therefore, eliminates some the wait associated with with the transit. Second, a cache also reduces the number of Web page requests that must be fulfilled by the system that is the ultimate source of the page, and, therefore, the wait associated with contention for the system is eliminated.

FIG. 1 depicts a block diagram of a computer network in the prior art in which one of the network's nodes acts as a cache for another of the nodes. Computer network 100 comprises three nodes that are interconnected logically as shown. The salient characteristic of the topology of computer network 100 is that node 121 communicates with node 101 only through node 111, and, therefore, node 111 is capable of intercepting and fulfilling requests from node 121 for node 101. In other words, although there might be more than one physical telecommunication path between node 101 and node 111 (not shown in FIG. 1) and more than one physical telecommunication path between node 111 and node 121 (also not shown in FIG. 1), and even a direct physical telecommunication path between node 101 and 121, node 111 is logically in the path between node 101 and node 121.

From the perspective of node 121 and node 111, node 101 actually or apparently comprises a vast amount of information arranged in bundles, called "resources." For the purposes of this specification, a "resource" is defined as an individually addressable bundle of information that can be requested by a node. For example, a resource might be an individual computer file (e.g., a World Wide Web page, a .gif file, a Java script, etc.) or a database record, etc. Although node 101 can actually comprise a vast amount of information if, for example, it is a disk farm, it can also apparently comprise the information if it acts as a gateway to a data network, such as the Internet.

When node 101 is bombarded with a large number of concurrent requests for resources from node 121, node 101 might not be able to instantaneously respond to all of the requests. Therefore, to reduce the average delay between when node 121 requests a resource from node 101 and when it receives the resource, node 111 functions as a cache for node 101.

FIG. 2 depicts a block diagram of the salient components of node 111 in accordance with the prior art. Node 111 comprises: processor 201, memory 202, receiver 210, transmitter 211, transmitter 213, and receiver 214. Processor 201 is either a general-purpose processor or a special-purpose processor that performs the functionality described herein with respect to FIG. 3. Memory 202 holds programs and data for processor 201 and comprises cache 203, which holds the cached resources for node 101. Node 111 uses receiver 210 for receiving data from node 121, transmitter 211 for transmitting to node 121, transmitter 213 for transmitting to node 101, and receiver 214 for receiving from node 121.

FIG. 3 depicts a flowchart of the operations performed by node 121 and node 111 when node 121 requests a resource from node 101 and node 111 intercepts the request, acts as a cache for node 101, and fulfills the request, if possible, or passes the request on to node 101, if necessary.

At step 301, node 111 stores one or more resources in cache 203, each of which resources is indexed by the resource identifier of the resource. For example, if the resource is a World Wide Web page (i.e., a hypertext markup language formatted file), the resource identifier might be the uniform resource locator or "URL" for the page (e.g., www.amazon.com/mccullers.htm, etc.). It is not germane to an understanding of the prior art or the present invention why some resources are stored in the cache data structure and why others are not.

At step 302, node 121 receives a resource identifier and a request for the resource. This request and resource identifier might, for example, originate with a user of node 121 as part of a World Wide Web browsing session (e.g., http://www.amazon.com/mccullers.htm, etc.).

At step 303, node 121 transmits: (i) the resource identifier, and (ii) a request for the resource to node 111, and at step 305 node 111 attempts to retrieve the requested resource from cache 203 using the resource identifier as the index into the cache data structure.

At step 306, node 111 determines if, in fact, the requested resource is in cache 203. If it is (i.e., a cache "hit"), then control passes to step 309; otherwise (i.e., a cache "miss") control passes to step 307.

If control passes to step 307, it means that the requested resource is not in cache 203 in node 111, that node 111 cannot fulfill the request itself, and, therefore, that node 111 must request the resource from node 101. Therefore, at step 307, node 111 transmits the resource identifier and request for the resource identifier to node 101, and at step 308 node 111 receives the requested resource. When the requested resources is in cache 203, and, therefore, that steps 307 and 308 can be avoided, the wait that a user must tolerate between when he or she requests a Web page and when the Web page is provided is usually reduced.

At step 309, node 111 transmits the resource to node 121, as requested, whether the requested resource was in cache 203 or not.

The increasing size and complexity of the Internet, and its increasing use for transmitting multimedia resources has created the need for improved caching techniques.

SUMMARY OF THE INVENTION

The present invention is a distributed caching technique for use in computer networks that avoids some of the costs and disadvantages associated with caching techniques in the prior art. In particular, the illustrative embodiment of the present invention recognizes that data processing systems that perform caching can be overwhelmed with the computational tasks associated with many concurrent requests, and, therefore, the illustrative embodiment removes some of the computational tasks away from the data processing system doing the caching to other systems that are less likely to be computationally burdened. Embodiments of the present invention are particularly advantageous in computer networks that comprise a logical hierarchical topology. Furthermore, some embodiments of the present invention use hashing techniques to facilitate the storage and retrieval of cached resources.

The illustrative embodiment of the present invention comprises: hashing at a first processor a first resource identifier to create a hash key, wherein the first resource identifier identifies a first resource; transmitting from the first processor to a second processor the hash key and a request for the first resource; and receiving at the first processor a second resource in response to the transmission of the hash key and the request for the first resource from the first processor to the second processor.

BRIEF DESCRIPTION OF THE DRAWINGS

FIG. 6 depicts a flowchart of the first variation of the operation of the illustrative embodiment of the present invention.

FIG. 8 depicts a flowchart of the third variation of the operation of the illustrative embodiment of the present invention.

FIG. 9 depicts a flowchart of the fourth variation of the operation of the illustrative embodiment of the present invention.

DETAILED DESCRIPTION

Figure 4:
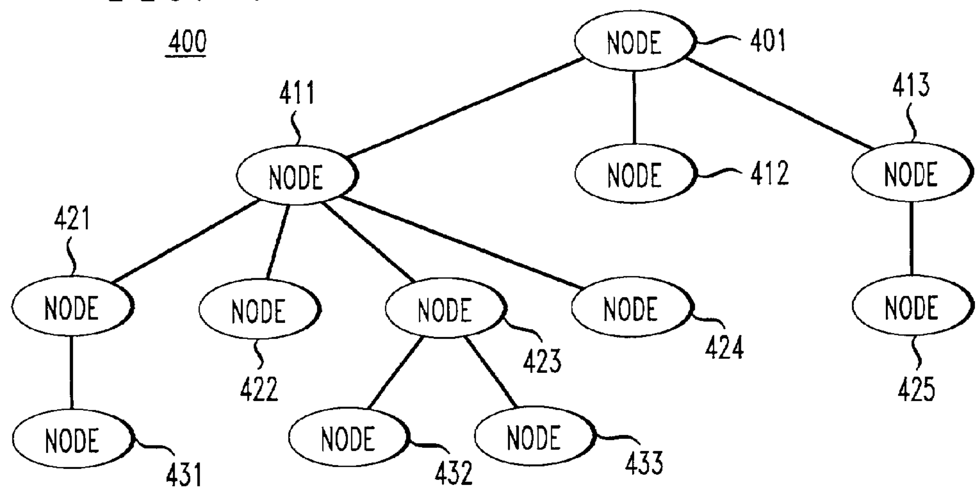
FIG. 4 depicts a block diagram of a hierarchical computer network in accordance with the illustrative embodiment of the present invention.

FIG. 4 depicts a block diagram of the illustrative embodiment of the present invention, which comprises 12 nodes (i.e., data processing systems) that are interconnected in a computer network with a logical hierarchical topology. In other words, although there might be one or more physical telecommunication links (not shown) between any two nodes depicted in FIG. 4, the nodes are interrelated in a logical hierarchy. This point is worth reiterating; the depicted paths between the nodes in FIG. 4 represent the logical hierarchical relationship of the nodes and not the physical telecommunication links that the nodes use to communicate with each other. Therefore, the illustrative embodiment is well-suited for networks with dynamic routing (e.g., Internet Protocol networks, etc.).

Although the illustrative embodiment comprises 12 data processing nodes in one particular hierarchy, it will be clear to those skilled in the art how to make and use embodiments of the present invention that comprise any number of nodes that are interconnected in any hierarchy. Furthermore, it will be clear to those skilled in the art how the inventions described herein are useful in any computer network with any logical topology—including those that are not hierarchical—and also to individual data processing systems and routers that comprise a cache memory.

In accordance with the illustrative embodiment of the present invention, each pair of interconnected nodes communicate with each other, either directly or indirectly, via one or more physical wireline or wireless telecommunications links or both (not shown in FIG. 4). It will be clear to those skilled in the art how to make and use such telecommunications links. For the purposes of this specification, the term "path" refers to the logical communication between the nodes and not to the physical telecommunications links between the nodes.

Because the illustrative embodiment has a hierarchical topology, several terms relating to hierarchies are defined so as to facilitate an unambiguous description of the illustrative embodiment. Therefore, for the purpose of this specification:

a "hierarchical computer network" is defined as a computer network in which there is only one logical communication path between any two nodes in the network, and one of the nodes in the network is designated as the "root."

a "given node" is any node in a computer network.

the "ancestral nodes" of a given node are defined as all of the nodes, if any, logically between the given node and the root, including the root. For example, the ancestral nodes of node 423 are nodes 411 and 401. One corollary of this definition is that the root has no ancestral nodes, but all other nodes have at least one ancestral node (the root).

the "parental node" of a given node is defined as only that node, if any, adjacent to the given node and in the logical path between the given node and the root. For example, the parental node of node 423 is node 411 and the parental node of node 411 is node 401. One corollary of this definition is that the root has no parental node. A second corollary is that all of the nodes in the hierarchy except the root have exactly one parental node. A third corollary of this definition is that a parental node of a given node is also an ancestral node of the given node, but an ancestral node of a given node might be, but is not necessarily a parental node of the given node.

the "grandparental node" of a given node is defined as only that node, if any, adjacent to the parental node of the given node and in the logical path between the given node and the root. For example, the grandparental node of node 432 is node 411, and the grandparental node of node 425 is node 401.

the "lineal nodes" of a given node are defined as all of the nodes, if any, that must communicate through the given node to communicate with the root. For example, the lineal nodes of node 411 are nodes 421, 422, 423, 424, 431, 432, and 433. One corollary of this definition is that all of the nodes other than the root are lineal nodes of the root.

the "filial nodes" of a given node are defined as all of the nodes, if any, that must communicate through the given node to communicate with the root and that are adjacent to the given node. For example, the filial nodes of node 411 are nodes 421, 422, 423, and 424. One corollary to this definition is that a filial node of a given node is also a lineal node of the given node, but a lineal of a given node might be, but is not necessarily a filial node of the given node.

the "leaves" of a hierarchy are defines as those nodes that do not have any filial nodes. For example, the leaves in the illustrative embodiment are nodes 412, 422, 424, 425, 431, 432, and 433.

In accordance with the illustrative embodiment, root node 401 actually or apparently comprises a vast amount of information, arranged in bundles called "resources," that are individually addressable and that can be individually requested by some or all of the nodes in hierarchical network 400. For example, root node 401 can be a disk farm or a gateway to a data network (not shown in FIG. 4), such as the Internet, that itself comprises some or all of the resources. In accordance with the illustrative embodiment, each resource is a file (e.g., a World Wide Web page, a .gif file, a Java script, etc.). It will be clear to those skilled in the art how to make and use embodiments of the present invention in which a resource is something other than a file.

For the purposes of this specification, a "resource identifier" is defined as the indicium of a resource. In accordance with the illustrative embodiment, each resource identifier is a uniform resource locator (e.g., www.amazon.com/books/102-8956393, etc.), which is commonly called a "URL." It will be clear to those skilled in the art how to make and use embodiments of the present invention in which a resource identifier is something other than a URL.

In accordance with the illustrative embodiment of the present invention, some or all of the nodes in the illustrative embodiment generate requests for resources that are originally available via root node 401. Some of these requests might be instigated by a user associated of a node and some of the requests might be instigated by a node itself. Typically, the leaf nodes are the nodes that originally generate the requests because the leaf nodes are typically those that interact most often with end-users.

Because root node 401 might be bombarded with many concurrent requests for resources, it is typically not able to instantaneously provide a requested resource. And because any delay between the time when a node requests a resource and when the node receives the resource is generally undesirable, the illustrative embodiment advantageously incorporates caches for reducing the average delay. In accordance with the illustrative embodiment of the present invention, each node advantageously acts as a cache for its lineal nodes.

Figure 5:
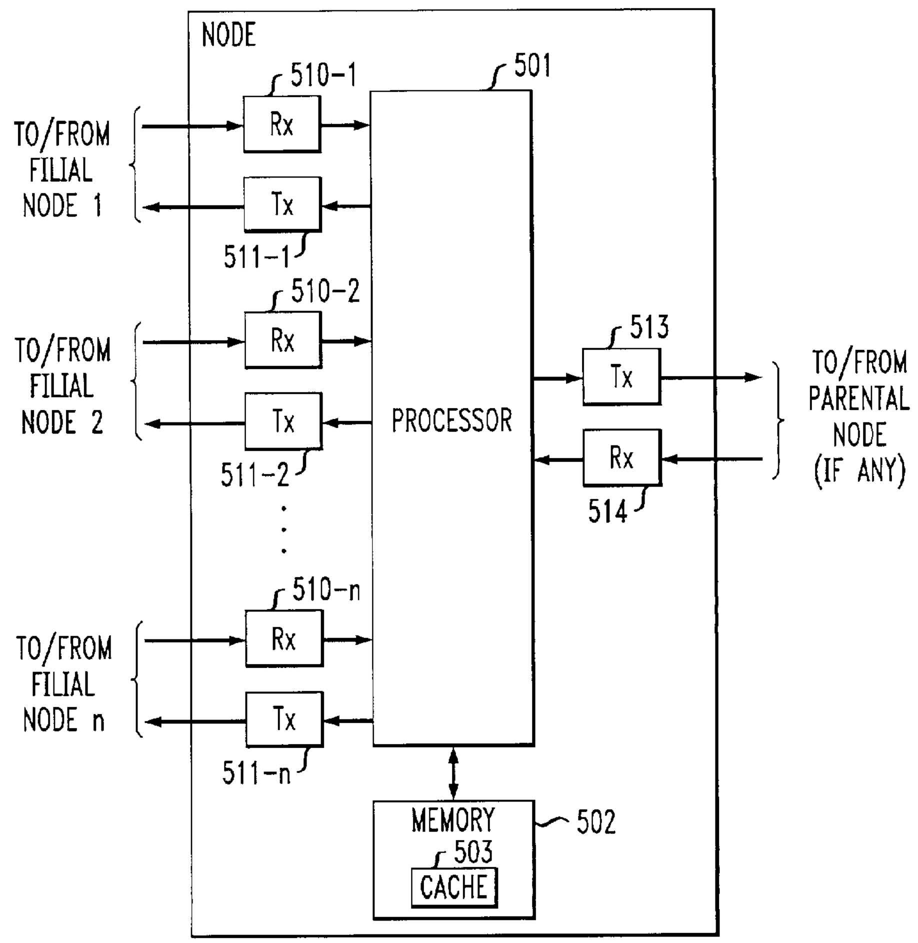
FIG. 5 depicts a block diagram of the salient components of a data processing node in accordance with the illustrative embodiment of the present invention.

FIG. 5 depicts a block diagram of the salient components of a data processing node in accordance with the illustrative embodiment of the present invention. Each data processing node comprises: processor 501, memory 502, cache 503, transmitter 513, receiver 514, receivers 510-1 through 510-n, and transmitters 511-1 through 511-n.

Processor 501 is advantageously a general-purpose processor or a special-purpose processor that performs the functionality described herein and with respect to FIGS. 6 though 10. Memory 502 holds programs and data for processor 501, and cache 503. It will be clear to those skilled in the art that memory 502 can utilize any storage technology (e.g., semiconductor RAM, magnetic hard disk, optical disk, etc.) or combination of storage technologies, and it will also be clear to those skilled in the art that memory 502 can comprise a plurality of memories with different memory spaces.

All nodes, including root node 401 if it is a gateway to a data network, comprise: transmitter 513 for transmitting data to its parental node (or to the data network in the case of the root node) and receiver 514 for receiving data from its parental node (or from the data network in the case of the root node). It will be clear to those skilled in the art how to make and use transmitter 513 and receiver 514.

All nodes, except the leaves, comprise: one or more receivers 510-i and one or more transmitters 511-i for communicating with each of the node's n filial nodes, where i=1 to n. It will be clear to those skilled in the art how to make and use receivers 510-1 through 510-n and transmitters 511-1 through 511-n.

Figure 2:
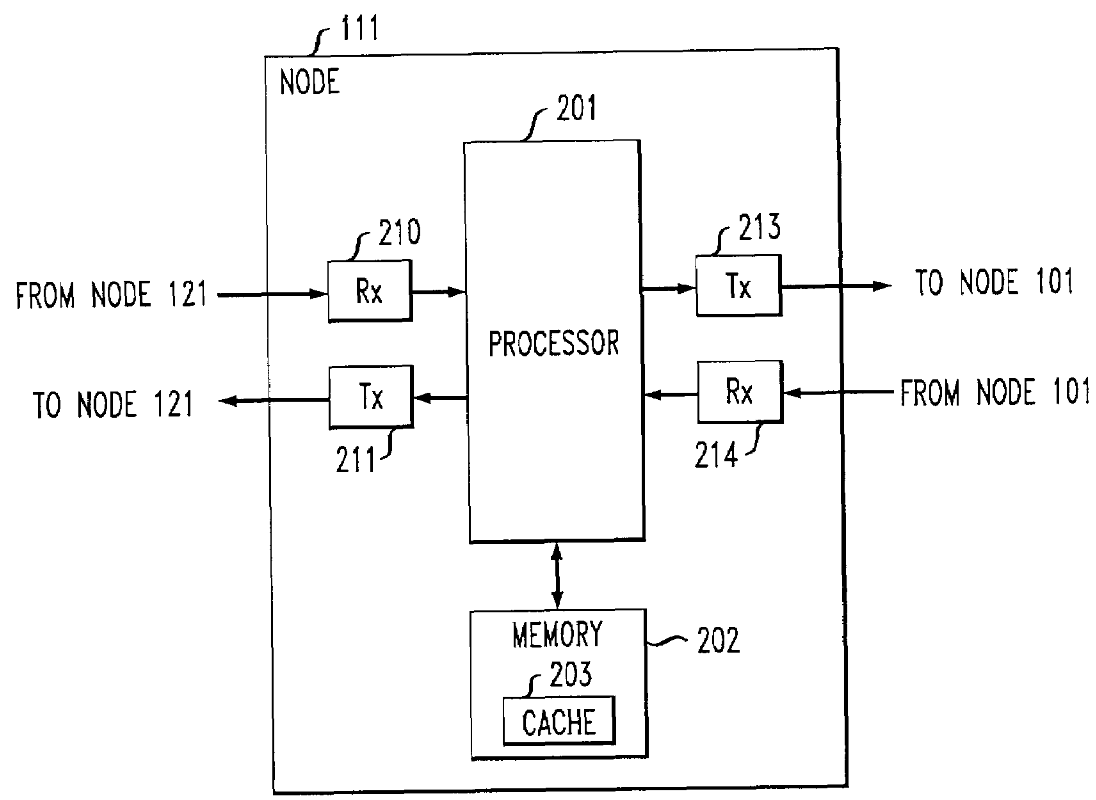
FIG. 2 depicts a block diagram of the salient components of one of the nodes depicted in FIG. 1.
Figure 3:
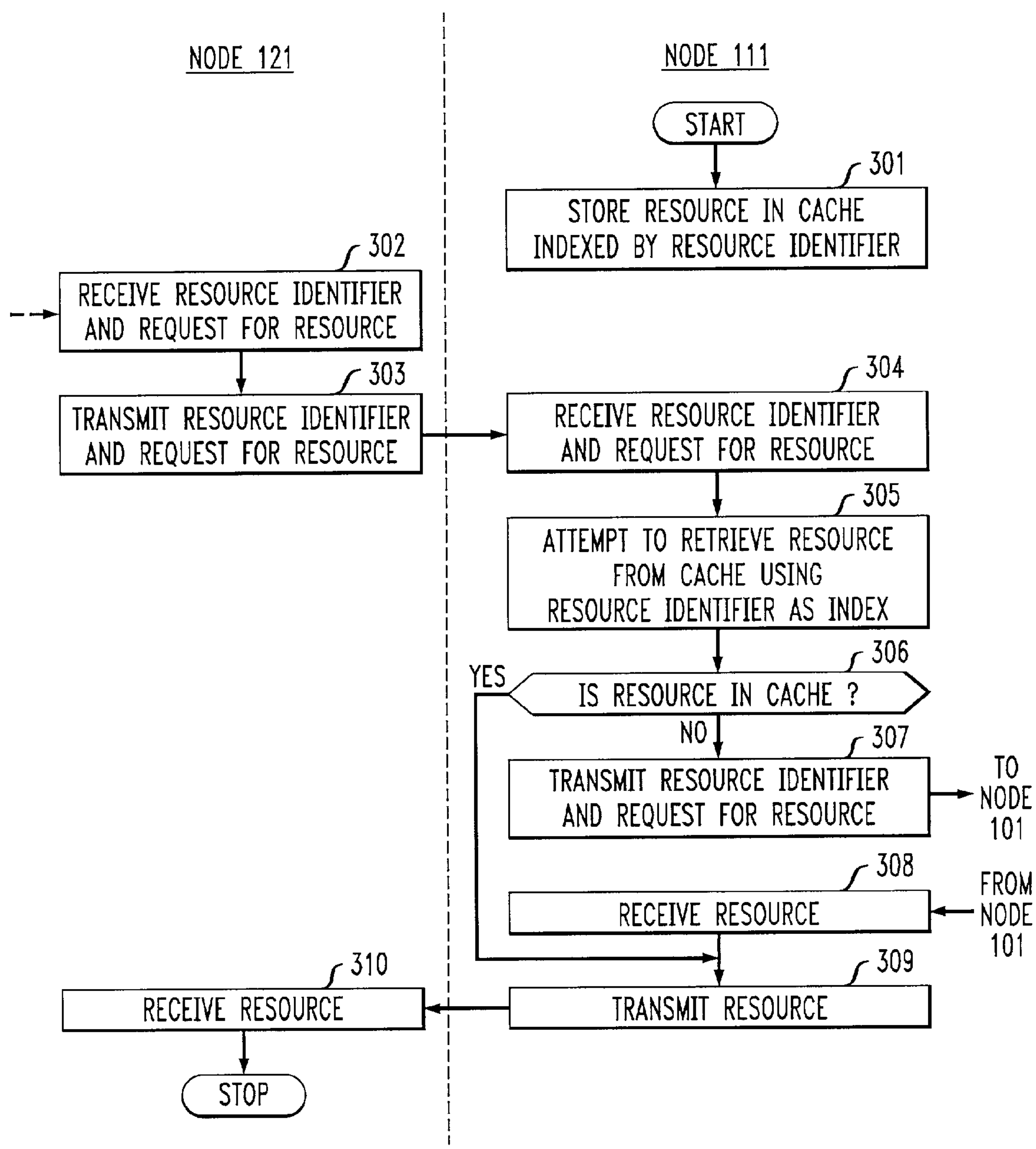
FIG. 3 depicts a flowchart of the operations performed by two of the nodes depicted in FIG. 1.

In the prior art and as described in FIGS. 1 through 3, the node that requests a resource (hereinafter the "requesting node ") from a node that caches that resource (hereinafter the "serving node") merely presents the serving node with the resource identifier for the resource. Thereafter, the serving node uses the resource identifier as the index into the cache data structure to retrieve the resource.

In contrast, the illustrative embodiment uses not the resource identifier as the index into the cache data structure, but a hash key that is based on the resource identifier as the index into the cache data structure. Although the advantages of using hashing and hash keys are well known, one of the principal disadvantages of hashing and hash keys in the prior art is that the serving node bears the burden of hashing each resource identifier. This can be computationally burdensome and can slow the response time of the serving node. Furthermore, if a node has tens or hundreds or thousands of filial nodes, each of which is continually requesting resources from the serving node, the serving node's computational resources can be overwhelmed.

Therefore, in accordance with the illustrative embodiment of the present invention, each given node is responsible for hashing each resource identifier and transmitting the hashed resource identifier to its parental node with a request for the resource. This has the advantage of distributing the computational task of hashing the resource identifiers down to lineal nodes, which are more likely to have spare computationally capacity than is the serving node.

For the purposes of this specification, the term "hash function" is defined as a mathematical transformation of an argument into a resultant, which for the purposes of this specification is called a "hash key."

FIGS. 6 through 9 each depict a flowchart of a different variation of the operation of the illustrative embodiment of the present invention. Each variation has different advantages and disadvantages and those will be discussed during the course of the discussion of each variation.

FIG. 6 depicts a flowchart of the first variation of the operation of the illustrative embodiment of the present invention, in which a given node, hereinafter called the "Given Node," requests a resource from its parental node, hereinafter called the "Parental Node."

At step 601, the Parental Node stores in cache 503:

i. the resource, and ii. the resource identifier for the resource in a data structure that is indexed by a hash key that is a hash function of the resource identifier of the resource.

As is discussed below, the purpose of storing the resource identifier in the data structure along with the resource itself is to enable the illustrative embodiment to resolve hashing collisions when an imperfect hash function is employed.

It will be clear to those skilled in the art how to make and use the hash function to generate hash keys, whether perfect or not, and the data structure, whether or not it incorporates a collision resolution mechanism (e.g., rehashing, external chaining, etc.).

Table 1 depicts a portion of a data structure in accordance with the illustrative embodiment of the present invention that stores a plurality of resources and their associated resource identifiers and that is indexed by a hash function of the resource identifier.

TABLE 1

First Variation of Data Structure in Cache 503

| Hash Key (table index) | Resource | Resource Identifier |
|---|---|---|
| . . . | . . . | . . . |
| hash key i | resource i | resource identifier i |
| hash key i + 1 | resource i + 1 | resource identifier i + 1 |
| hash key i + 2 | resource i + 2 | resource identifier i + 2 |
| . . . | . . . | . . . |

The predicate events that cause the parental node to store the resource and the resource identifier in the data structure are not germane to a present understanding of the present invention but can include, for example, a prior request for the resource by the Given Node or by a lineal node of the Given Node or by a lineal node of the Parental Node. It will be clear to those skilled in the art, however, that the present invention can be combined with the cache population techniques described in applicants' co-pending U.S. patent application Ser. No. 09/725,737, entitled "Method and Apparatus for Economical Cache Population." Once the resource and the resource identifier are stored in the data structure, they can be provided to the Given Node upon request.

In some embodiments of the present invention, as part of step 601, the hash key is also stored in a list of valid hash keys in the Given Node when the cache is initially populated with the resource, and the hash key is transmitted in step 604 only when the hash key generated in step 603 below is contained within the list of valid hash keys in the Given Node.

At step 602, the Given Node receives a resource identifier and a request for the resource. This request and resource identifier might, for example, originate with a user of the Given Node as part of a World Wide Web browsing session (e.g., http://www.amazon.com/mccullers.htm, etc.). As another example, the request and resource identifier can originate with a lineal node of the Given Node, in which case the Given Node might retrieve the resource and store it and its resource identifier in its own cache.

At step 603, the Given Node hashes the resource identifier with a hash function to create a hash key. Advantageously the hash function used in step 603 is a compatible hash function that is used in step 601 by the Parental Node when creating the hash key for the resource.

At step 604, the Given Node transmits:

i. the resource identifier, ii. the hash key, and iii. a request for the resource to the Parental Node.

At step 605, the Parental Node receives:

i. the resource identifier, ii. the hash key, and iii. a request for the resource from the Given Node. It should be understood that the request for the resource can be either explicit or implicit. For example, an explicit request might comprise a command code that accompanies the resource identifier and the hash key and that is to be interpreted as a request for the resource associated with the resource identifier and the hash key. Alternatively, an implicit request might be assumed whenever the Parental Node merely receives a resource identifier or a hash key or both from the Given Node.

At step 606, the Parental Node uses the hash key it received in step 605 as an index into the data structure to retrieve the resource and resource identifier. If the data structure incorporates a hash collision resolution mechanism and there are multiple resources and resource identifiers in the data structure with the same hash key as the index, each pair of resources and resource identifiers is retrieved. Alternatively, in some embodiments of the present invention in which there are multiple resources and resource identifiers in the data structure that are indexed with the same hash key, the alternative embodiments iterate between retrieving one pair of resources and resource identifiers and checking (in step 607) whether the requested resource is found until it is found (i.e., a cache hit) or until there are no more resources in the data structure indexed with that hash key (i.e., a cache miss).

At step 607, the Parental Node compares the resource identifier received from the Given Node in step 605 against the resource identifiers retrieved in step 606 to: (i) identify which, if any, of the resources retrieved in step 606 are, in fact, the requested resource, and (ii) ascertain if the requested resource is in the Parental Node's cache data structure. If, based on a comparison of the resource identifiers, the requested resource is found in the Parental Node's cache data structure, control passes to step 610. Alternatively, control passes to step 608.

At step 608, the Parental Node begins the process, which is completed in step 609, of retrieving the requested resource from its parental node, hereinafter the "Grandparental Node," because the requested resource is not within the Parental Node's cache data structure. Advantageously, the Parental Node retrieves the requested resource from its parental node in the same manner that the Given Node did from the Parental Node. In other words, step 608 for the Parental Node is identical to step 604 for the Given Node in that the Parental Node advantageously transmits:

i. the resource identifier,
ii. the hash key, and
iii. a request for the resource to its parental node. In this way, steps 604 through 611 in FIG. 6 are recursive up through the hierarchy until the requested resource is found.

At step 609, the Parental Node receives the requested resource from the Grandparental Node. As part of step 609, the Parental Node might store the resource and its resource identifier in the data structure indexed by the hash function of the resource identifier, or it might not. Furthermore, step 609 for the Parental Node is advantageously identical to step 611 for the Given Node. It will be clear to those skilled in the art, how to accomplish step 609.

At step 610, the Parental Node transmits the resource to the Given Node, and at step 611, the Given Node receives the resource.

Figure 7:
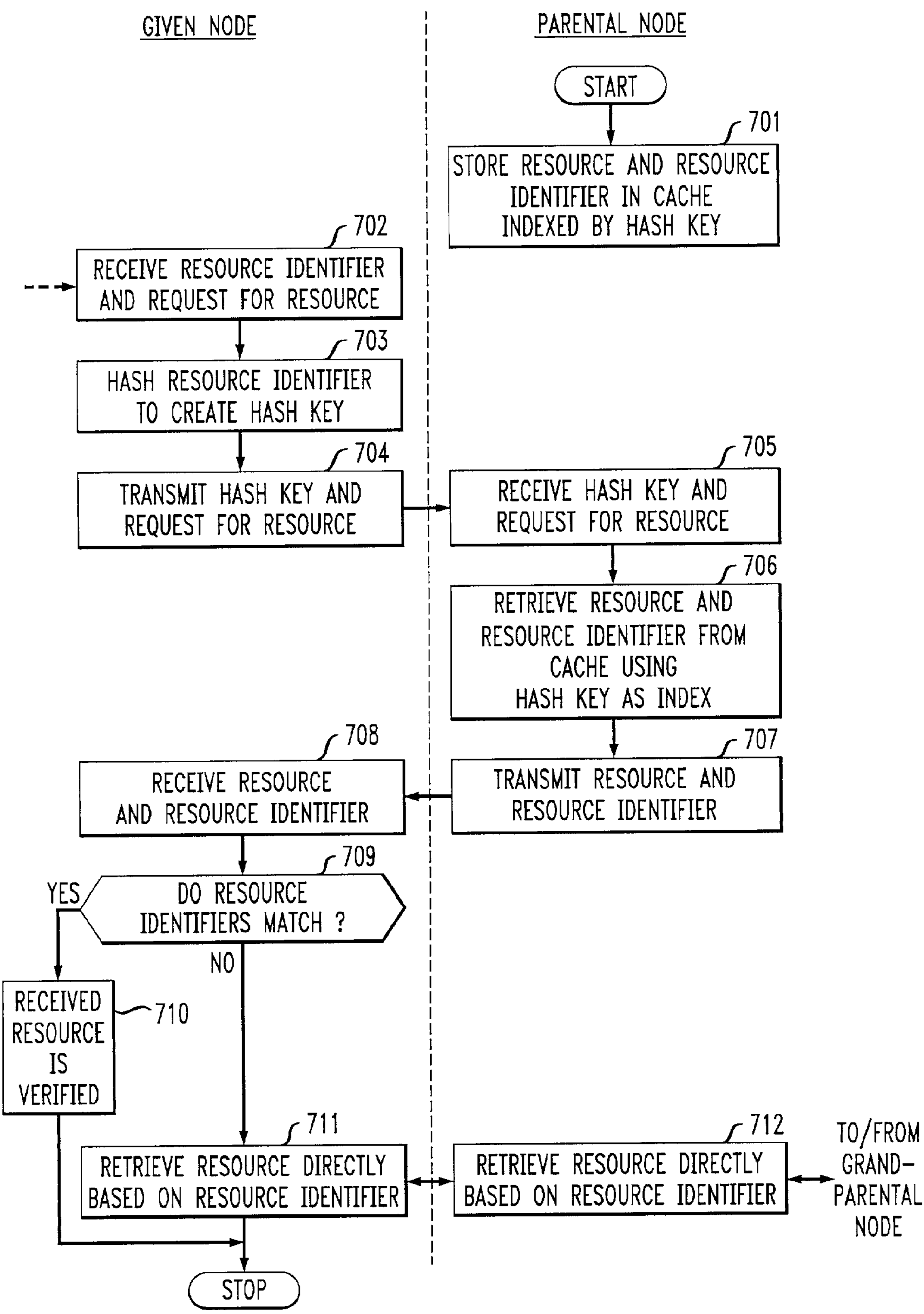
FIG. 7 depicts a flowchart of the second variation of the operation of the illustrative embodiment of the present invention.

FIG. 7 depicts a flowchart of the second variation of the operation of the illustrative embodiment of the present invention, in which a given node, hereinafter called the "Given Node," requests a resource from its parental node, hereinafter called the "Parental Node." The second variation differs from the first variation in that it is the Given Node and not the Parental Node that:

i. resolves hash collisions,
ii. determines if the Parental Node has provided the requested resource, and
iii. initiates the retrieval of the requested resource from its Grandparental Node if the Parental Node has not provided the requested resource.

The second variation is advantageous over the first variation in that the computational task of resolving hash collisions is moved from the Parental Node, which might be computationally taxed, to the Given Node, which is more likely than the Parental Node to have spare computational capacity.

At step 701, the Parental Node stores in cache 503:

i. the resource, and
ii. the resource identifier of the resource in a data structure that is indexed by a hash key that is a hash function of the resource identifier of the resource. Step 701 is advantageously identical to step 601 in FIG. 6.

At step 702, the Given Node receives a resource identifier and a request for the resource identifier. Step 702 is advantageously identical to step 602 in FIG. 6.

At step 703, the Given Node hashes the resource identifier with a hash function to create a hash key. Advantageously, the hash function used in step 703 is identical to, or is at least is compatible with, the hash function used in step 701. Step 703 is advantageously identical to step 603 in FIG. 6.

At step 704, the Given Node transmits:

i. the hash key, and
ii. a request for the resource to the Parental Node. In contrast to step 604 in FIG. 6, in step 704 it is not necessary that the Given Node transmit the resource identifier to the Parental Node.

At step 705, the Parental Node receives:

i. the hash key, and
ii. a request for the resource from the Given Node. In contrast to step 605 in FIG. 6, in step 705, it is not necessary that the resource identifier be received by the Parental Node. It should be understood that the request for the resource can be either explicit or implicit. For example, an explicit request might comprise a command code that accompanies the hash key and that is to be interpreted as a request for the resource associated with the hash key. Alternatively, an implicit request might be assumed whenever the Parental Node merely receives a hash key from the Given Node.

At step 706, the Parental Node uses the hash key it received in step 705 as an index into the data structure to retrieve the resource and resource identifier. If the data structure incorporates a hash collision resolution mechanism and there are multiple resources and resource identifiers in the data structure with the same hash key as the index, each pair of resources and resource identifiers is retrieved. Alternatively, in some embodiments of the present invention in which there are multiple resources and resource identifiers in the data structure that are indexed with the same hash key, the alternative embodiments iterate between retrieving one pair of resources and resource identifiers and checking whether the requested resource is found until it is found (i.e., a cache hit) or until there are no more resources in the data structure indexed with that hash key (i.e., a cache miss). Step 706 is advantageously identical to step 606 in FIG. 6.

At step 707, the Parental Node transmits each pair of resources and resource identifiers it retrieves in step 706, if there are any, to the Given Node.

At step 708, the Given Node receives each pair of resources and resource identifiers transmitted in step 707.

At step 709, the Given Node compares the resource identifier received in step 702 against the resource identifiers received in step 708 to: (i) identify which, if any, of the resources retrieved in step 706 are, in fact, the requested resource, and (ii) ascertain if the requested resource is in the Parental Node's data structure. If, based on a comparison of the resource identifiers, the requested resource is has been received, then control passes to step 710. Alternatively, control passes to step 711.

At step 710, the received resource is verified and the process ends.

At step 711 and 712, the Given Node and the Parental Node cooperate to retrieve the resource from the Grandparental Node based on the resource identifier. It will be clear to those skilled in the art how to accomplish steps 711 and 712. As part of steps 711 and 712, the Parental Node might store the resource and its resource identifier in the data structure as indexed by the hash function of the resource identifier, or it might not.

FIG. 8 depicts a flowchart of the third variation of the operation of the illustrative embodiment, in which a given node, hereinafter called the "Given Node," requests a resource from its parental node, hereinafter called the "Parental Node." The third variation is like the first variation in that it is the Parental Node that:

i. resolves hash collisions, and
ii. unilaterally initiates the retrieval of the requested resource from its parental node, hereinafter called the "Grandparental Node," if the Parental Node does not have it.

The salient difference between the third variation and the first variation is that the third variation uses two different hash keys, both of which are based on the resource identifier. The second hash key is used as the index into the cache data structure, as in the first and second variations, and the first hash key is used to resolve hash collisions, whereas in the first and second variations the resource identifier itself is used to resolve hash collisions. An advantage of the third variation over the first variation is that the character length of the first hash key is known and fixed, and, therefore, the computational complexity of the hash collision resolution comparison is known and fixed. A disadvantage of the third variation over the first variation is that it requires the Given Node to perform two distinct hash functions (or one larger one whose output is bifurcated into two keys) rather than just one.

Figure 13:
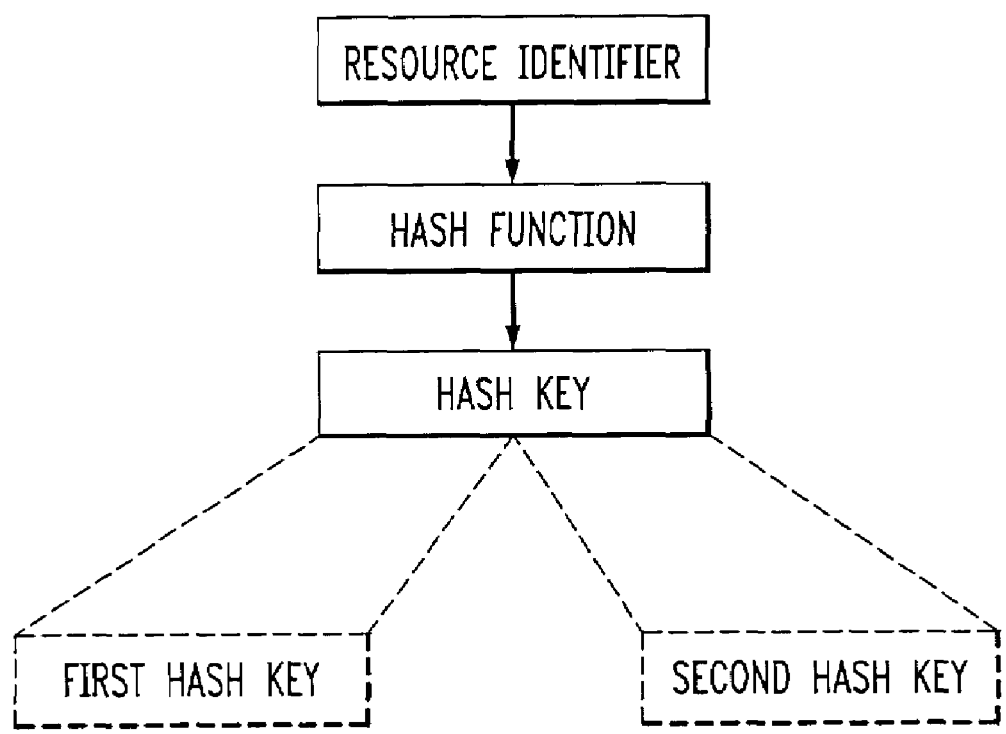
FIG. 13 depicts a hash function in which one portion of the output is used as a first hash key and a second distinct portion is used as a second hash key.

At step 801, the Parental Node stores in cache 503:

i. the resource, and ii. a first hash key based on the resource identifier in a data structure that is indexed by a second hash key that is also hash function of the resource identifier. The first hash key and the second hash key can be generated by either: (1) different hash functions, or, (2) as depicted in FIG. 13, by one hash function in which one portion of the output is used as the first hash key and a second distinct portion is used as the second hash key. At step 802, the Given Node receives a resource identifier and a request for the resource identifier. Step 802 is advantageously identical to step 602 in FIG. 6.

At step 803, the Given Node hashes the resource identifier to create a first hash key and a second hash key. Advantageously, the hash function(s) used to create the first hash key and the second hash key in step 803 are identical to, or is at least is compatible with, the hash function(s) used to create the first hash key and the second hash key in step 801.

At step 804, the Given Node transmits:

i. the first hash key, ii. the second hash key, iii. the resource identifier, and iv. a request for the resource to the Parental Node. In contrast to step 604 in FIG. 6, in step 804 the first hash key, which is used by the Parental Node to resolve collisions, is transmitted to the Parental Node in addition to the resource identifier, which in the embodiment depicted in FIG. 6 was used by the Parental Node to resolve collisions. Therefore, it might initially appear wasteful for the Given Node to transmit both the first hash key and the resource identifier to the Parental Node, but it is not. The reason that the resource identifier is transmitted is because an ancestral node (e.g., the root node, etc.) of the Parental Node might need to use it to acquire the resource if it is not contained in its own cache data structure. This is, for example, true where root node 401 is a gateway to a data network that requires the resource identifier to identify the resource.

At step 805, the Parental Node receives:

i. the first hash key, ii. the second hash key, iii. the resource identifier, and iv. a request for the resource from the Given Node. In contrast to step 605 in FIG. 6, in step 705, the first hash key is received by the Parental Node the Parental Node in addition to the resource identifier. It should be understood that the request for the resource can be either explicit or implicit. For example, an explicit request might comprise a command code that accompanies the resource identifier, the first hash key, and the second hash key and that is to be interpreted as a request for the resource associated with the resource identifier, the first hash key, and the second hash key. Alternatively, an implicit request might be assumed whenever the Parental Node merely receives a second hash key from the Given Node.

At step 806, the Parental Node uses the second hash key it received in step 805 as an index into the data structure to retrieve the resource and first hash key. If the data structure incorporates a hash collision resolution mechanism and there are multiple resources and first hash keys in the data structure with the same second hash key as the index, each pair of resources and first hash keys is retrieved. Alternatively, in some embodiments of the present invention in which there are multiple resources and resource identifiers in the data structure that are indexed with the same hash key, the alternative embodiments iterate between retrieving one pair of resources and resource identifiers and checking (in step 807) whether the requested resource is found until it is found (i.e., a cache hit) or until there are no more resources in the data structure indexed with that hash key (i.e., a cache miss).

At step 807, the Parental Node compares the first hash key received in step 805 against the first hash key(s) retrieved in step 806 to: (i) identify which, if any, of the resources retrieved in step 806 are, in fact, the requested resource, and (ii) ascertain if the requested resource is in the Parental Node's data structure. If, based on a comparison of the first hash keys, the requested resource is found in the Parental Node's cache data structure, control passes to step 810. Alternatively, control passes to step 808.

At step 808, the Parental Node begins the process, which is completed in step 809, of retrieving the requested resource from its parental node, hereinafter the "Grandparental Node," because the requested resource is not within its data structure. Advantageously, the Parental Node retrieves the requested resource from the Grandparental Node in the same manner that the Given Node did from the Parental Node. In other words, step 808 for the Parental Node is identical to step 804 for the Given Node in that the Parental Node advantageously transmits:

i. the first hash key, ii. the second hash key, iii. the resource identifier, and iv. a request for the resource to its parental node. In this way, steps 804 through 811 depicted in FIG. 8 are recursive throughout the entire hierarchical computer network until the requested resource is found.

At step 809, the Parental Node receives the requested resource from the Grandparental Node. As part of step 809, the Parental Node might store the resource and its resource identifier in the data structure as indexed by the hash function of the resource identifier, or it might not. Furthermore, step 809 for the Parental Node is advantageously identical to step 811 for the Given Node. It will be clear to those skilled in the art, how to accomplish step 809.

At step 810, the Parental Node transmits the resource to the Given Node, and at step 811, the Given Node receives the resource.

FIG. 9 depicts a flowchart of the fourth variation of the operation of the illustrative embodiment of the present invention, in which a given node, hereinafter called the "Given Node," requests a resource from its parental node, hereinafter called the "Parental Node." The fourth variation differs from the third variation in that it is the Given Node that:

i. resolves hash collisions, ii. determines if the Parental Node has provided the requested resource, and iii. initiates the retrieval of the requested resource from its Grandparental Node if the Parental Node has not provided the requested resource.

The fourth variation is advantageous over the third variation because the computational task of resolving hash collisions is moved from the Parental Node, which might be computationally taxed, to the Given Node, which is more likely than the Parental Node to have spare computational capacity.

At step 901, the Parental Node stores in cache 503:

i. the resource, and ii. a first hash key based on the resource identifier of the resource in a data structure that is indexed by a second hash key that is also hash function of the resource identifier of the resource. Step 901 is advantageously identical to step 801 in FIG. 8.

At step 902, the Given Node receives a resource identifier and a request for the resource identifier. Step 902 is advantageously identical to step 802 in FIG. 8.

At step 903, the Given Node hashes the resource identifier with to create a first hash key and a second hash key. Advantageously, the hash function(s) used to create the first hash key and the second hash key in step 903 are identical to, or is at least is compatible with, the hash function(s) used to create the first hash key and the second hash key in step 901. Step 903 is advantageously identical to step 803 in FIG. 8.

At step 904, the Given Node transmits:

i. the second hash key, ii. a request for the resource to the Parental Node. In contrast to step 804 in FIG. 8, in step 904 it is not necessary that the Given Node transmit the resource identifier or the first hash key to the Parental Node.

At step 905, the Parental Node receives:

i. the second hash key, ii. a request for the resource from the Given Node. In contrast to step 805 in FIG. 8, in step 905, it is not necessary that either the resource identifier or the first hash key be received by the Parental Node. It should be understood that the request for the resource can be either explicit or implicit. For example, an explicit request might comprise a command code that accompanies the second hash key and that is to be interpreted as a request for the resource associated with the second hash key. Alternatively, an implicit request might be assumed whenever the Parental Node merely receives a second hash key from the Given Node. At step 906, the Parental Node uses the second hash key it received in step 805 as an index into the data structure to retrieve the resource and first hash key. If the data structure incorporates a hash collision resolution mechanism and there are multiple resources and first hash keys in the data structure with the same second hash key as the index, each pair of resources and first hash keys is retrieved.

Alternatively, in some embodiments of the present invention in which there are multiple resources and resource identifiers in the data structure that are indexed with the same hash key, the alternative embodiments iterate between retrieving one pair of resources and resource identifiers and checking whether the requested resource is found until it is found (i.e., a cache hit) or until there are no more resources in the data structure indexed with that hash key (i.e., a cache miss). Step 906 is advantageously identical to step 806 in FIG. 8.

At step 907, the Parental Node transmits each pair of resources and resource identifiers it retrieves in step 906, if there are any, to the Given Node.

At step 908, the Given Node receives each pair of resources and resource identifiers transmitted in step 907.

At step 909, the Given Node compares the first hashed key created in step 903 against the first hashed keys received in step 908 to: (i) identify which, if any, of the resources retrieved in step 906 are, in fact, the requested resource, and (ii) ascertain if the requested resource is in the Parental Node's data structure. If, based on a comparison of the first hashed keys, the requested resource is available, then control passes to step 910. Alternatively, control passes to step 911.

At step 910, the received resource is verified and the process ends.

At step 911 and 912, the Given Node and the Parental Node cooperate to retrieve the resource from the Grandparental Node based on the resource identifier. It will be clear to those skilled in the art how to accomplish steps 911 and 912. As part of steps 911 and 912, the Parental Node might store the resource and its resource identifier in the data structure as indexed by the hash function of the resource identifier, or it might not.

Figure 10:
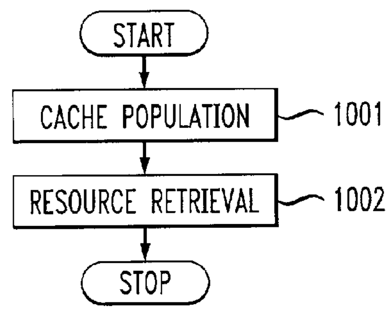
FIG. 10 depicts a flowchart of the fifth variation of the operation of the illustrative embodiment of the present invention.

FIG. 10 depicts a flowchart of the fifth variation of the operation of the illustrative embodiment of the present invention, in which a given node, hereinafter called the "Given Node," requests a resource from its parental node, hereinafter called the "Parental Node."

The fifth variation differs from the first four variations in that the Given Node comprises a "Table of Cached Resources," which is a table that indicates which hash keys that the Given Node might generate correspond to resources that have been already cached in the Parental Node. In other words, the Given Node is capable of conclusively determining if the Parental Node's cache does not contain a resource corresponding to a given hash key, and, therefore should retrieve the resource directly. It should be understood, however, that the converse is not true. The Table of Cached Resources merely indicates that a resource corresponding to a given hash key is cached, but not that it is the resource corresponding to the resource identifier. This asymmetry results because different resource identifiers that represent different resources can hash to the same hash key.

In accordance with the fifth variation, it is the Given Node that:

iv. resolves hash collisions, v. determines if the Parental Node has provided the requested resource, and vi. initiates the retrieval of the requested resource from its Grandparental Node if the Parental Node has not provided the requested resource.

Furthermore, in the fifth variation, it is the Given Node that bears the ultimate responsibility for ensuring that a resource, however and from whomever retrieved, is the resource corresponding to the resource identifier. The fifth variation is advantageous because many of the computational tasks are performed by the Given Node, which is more likely than the Parental Node to have spare computational capacity.

As shown in FIG. 10, the fifth variation comprises two macro steps: cache population 1001 and resource retrieval 1002. In accordance with the macro step of cache population, one or more resources and their associated resource identifiers are stored in the Parental Node's cache using a hash function of each resource identifier as the index as illustrated in Table 1, above.

Figure 11:
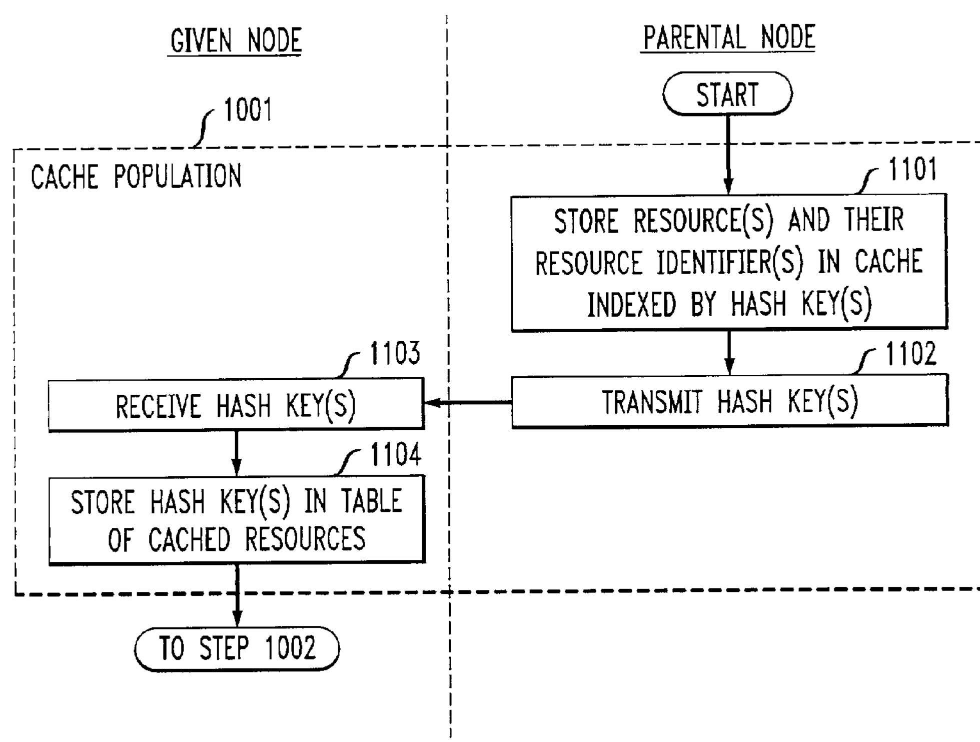
FIG. 11 depicts a flowchart of the cache population portion of the fifth variation depicted in FIG. 10.

In accordance with the macro step of resource retrieval, the Given Node: (1) receives a request for a resource, (2) determines if the Parental Node might have the resource in its cache, (3) requests the resource from the Parental Node, if it might be there, (4) determines if the requested resource has been received from the Parental Node, and (5) retrieves the resource directly from the Grandparental Node, if the resource is unavailable from the Parental Node. The macro step of cache population is described in detail in FIG. 11, and the macro step of resource retrieval is described in detail in FIG. 12.

Figure 1:
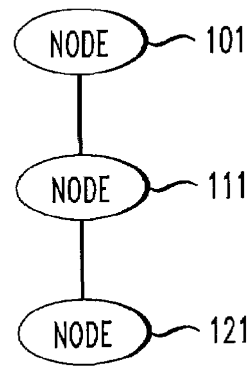
FIG. 1 depicts a block diagram of a computer network in the prior art.

At step 1101 in FIG. 1, the Parental Node stores in cache 503:

iii. one or more resources, and iv. the resource identifier associated with each resource in a data structure that is indexed by a hash key that is a hash function of the resource identifier of the resource. The result of step 1101 is a table such as that depicted in Table 1, above. Step 1101 is advantageously identical to step 601 in FIG. 6.

At step 1102, the Parental Node transmits an indicium of each hash key that points to a resource stored in cache 503 to the Given Node. The indicium can be, for example, either the hash key itself or the resource identifier that is associated with the hash key or a single bit entry in a bit vector of all possible hash keys.

At step 1103, the Given Node receives the indicium of each hash key, and, at step 1104 stores it in a "Table of Cached Resources." Table 2 depicts an illustrative Table of Cached Resources that is a listing of the hash keys that point to cached resources in cache 503.

TABLE 2

| First illustrative Table of Cached Resources<br>Cached Resources |
| --- |
| 397 |
| 792 |
| 1044 |
| . . . |
| 7345 |

Table 3 depicts an illustrative of Cached Resources that is a bit-vector of the hash keys that point to cached resources in cache 503.

TABLE 3

| Second Illustrative Table of Cached Resources | |
| --- | --- |
| Index | Resource Cached? |
| 0 | Yes |
| 1 | No |
| 2 | Yes |
| 3 | No |
| 4 | No |
| 5 | No |
| 6 | Yes |
| . . . | . . . |

Regardless of the data present the Table of Cache Resources, the Table enables the Given Node to conclusively determine, as stated above, whether a specific resource is not stored in cache 503.

Figure 12:
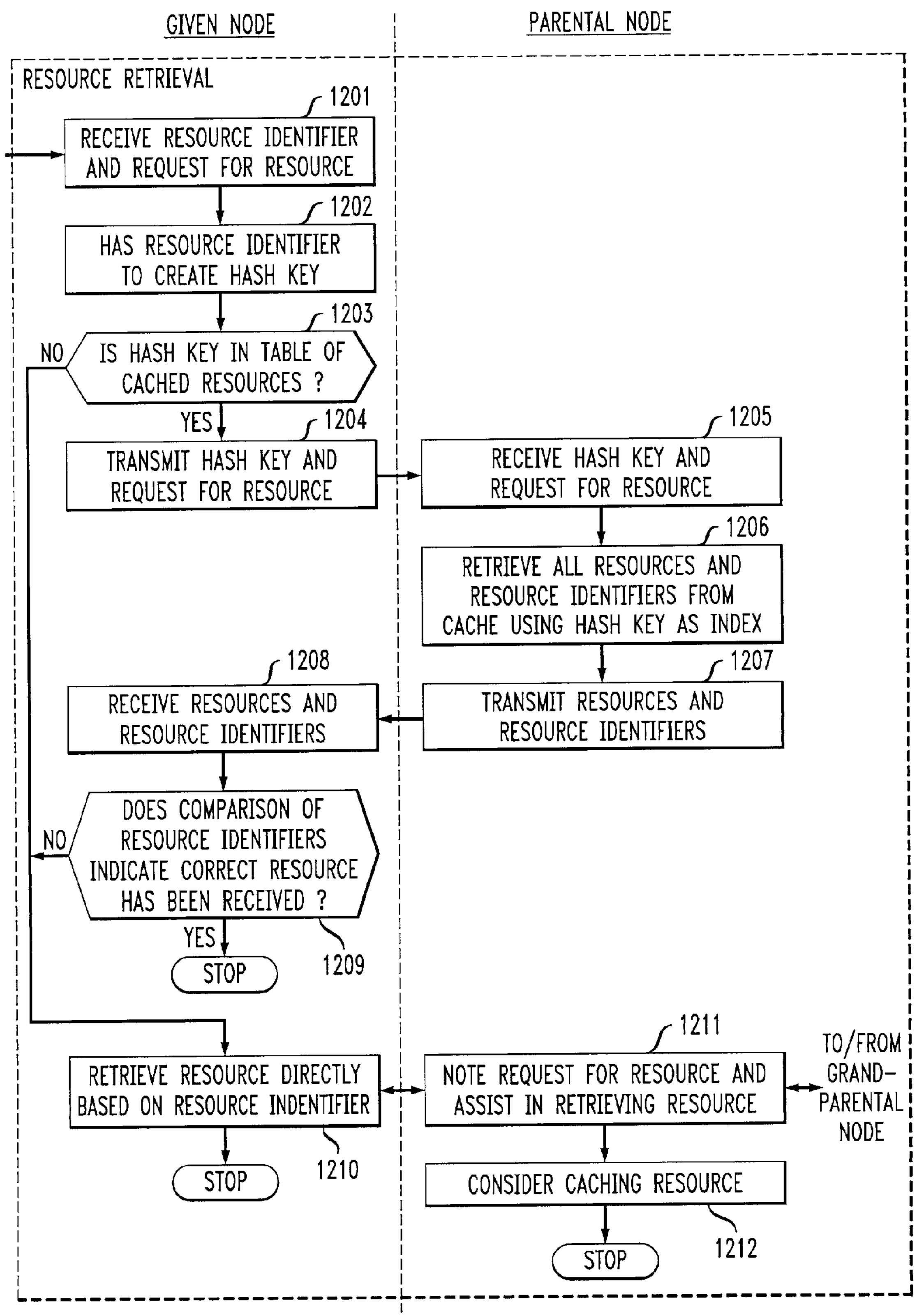
FIG. 12 depicts a flowchart of the resource retrieval portion of the fifth variation depicted in FIG. 10.

At step 1201 in FIG. 12, the macro step of resource retrieval begins. At step 1201, the Given Node receives a resource identifier and a request for the resource. This request and resource identifier might, for example, originate with a user of the Given Node as part of a World Wide Web browsing session (e.g., http://www.amazon.com/mcculler-s.htm, etc.). As another example, the request and resource identifier can originate with a lineal node of the Given Node, in which case the Given Node might retrieve the resource and store it and its resource identifier in its own cache. Step 1201 is advantageously identical to step 602.

At step 1202, the Given Node hashes the resource identifier with a hash function to create a hash key. Advantageously the hash function used in step 603 is a compatible hash function that is used in step 1101 by the Parental Node when creating the hash key for the resource.

At step 1203, the Given Node determines if the hash key created in step 1202 and the Table of Cache Resources indicates that the requested resource might be stored in the Parental Node's cache. If the inquiry determines that it might be, then control passes to step 1204; otherwise control passes to step 1210.

At step 1204, the Given Node transmits:

i. the hash key, and ii. a request for the resource to the Parental Node.

At step 1205, the Parental Node receives:

i. the hash key, and ii. a request for the resource from the Given Node. It should be understood that the request for the resource can be either explicit or implicit.

At step 1206, the Parental Node uses the hash key it received in step 1205 as an index into the data structure to retrieve the resource and resource identifier. If the data structure incorporates a hash collision resolution mechanism and there are multiple resources and resource identifiers in the data structure with the same hash key as the index, each pair of resources and resource identifiers is retrieved.

At step 1207, the Parental Node transmits each pair of resources and resource identifiers retrieved from the cache in step 1206.

At step 1208, the Given Node receives each pair of resources and resource identifiers transmitted in step 1207.

At step 1209, the Given Node compares the resource identifier received in step 1201 to the resource identifiers received in step 1208 to determine if one of the resources received in step 1208 is the requested resource. If the comparison indicates that the requested resource was received, then the process stops; otherwise, control passes to step 1210.

At step 1210, the Given Node retrieves the requested resource directly based on the resource identifier.

At step 1211, the Parental Node notes the request for the requested resource and assists, if necessary or advantageous, the Given Node in retrieving the requested resource from the Grandparental Node. It is advantageous that the Parental Node notes the request for the requested resource because it might affect the Parental Node's decision of whether to cache that resource in cache 503 in the future.

At step 1212, the Parental Node considers caching the requested resource so that the next time it is requested, it is available.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:

hashing at a first processor a first resource identifier to create a hash key, wherein said first resource identifier identifies a first resource;

transmitting from said first processor to a second processor said hash key and a request for said first resource; and receiving at said first processor a second resource in response to the transmission of said hash key and said request for said first resource.

2. The method of claim 1 further comprising receiving at said first processor a second resource identifier in response to the transmission of said hash key and said request for said first resource.

3. The method of claim 2 wherein said first processor verifies that said second resource is said first resource by comparing said second resource identifier to said first resource identifier.

4. The method of claim 1 further comprising transmitting from said first processor to said second processor said first resource identifier in addition to said hash key and said request for said first resource.

5. The method of claim 4 wherein said second processor stores said second resource and said second resource identifier in a data structure that is indexed by said hash key.

6. The method of claim 5 wherein said second processor verifies that said second resource is said first resource by comparing said second resource identifier to said first resource identifier.

7. The method of claim 1 wherein said hash key and said request for said first resource are transmitted from said first processor to said second processor when said all or a portion of said hash key is contained in a list of valid hash keys associated with said first processor.

8. An apparatus comprising:

a first processor for hashing a first resource identifier to create a hash key, wherein said first resource identifier identifies a first resource;

a transmitter for transmitting said hash key and a request for said first resource to a second processor; and a receiver for receiving a second resource in response to the transmission of said hash key and said request for said first resource.

9. The apparatus of claim 8 wherein said receiver also receives a second resource identifier in response to the transmission of said hash key and said request for said first resource.

10. The apparatus of claim 9 wherein said first processor verifies that said second resource is said first resource by comparing said second resource identifier to said first resource identifier.

11. The apparatus of claim 8 wherein said transmitter also transmits to said second processor said first resource identifier in addition to said hash key and said request for said first resource.

12. The apparatus of claim 11 wherein said second processor stores said second resource and said second resource identifier in a data structure that is indexed by said hash key.

13. The apparatus of claim 12 wherein said second processor verifies that said second resource is said first resource by comparing said second resource identifier to said first resource identifier.

14. The apparatus of claim 8 wherein said hash key and said request for said first resource are transmitted from said first processor to said second processor when said all or a portion of said hash key is contained in a list of valid hash keys associated with said first processor.

15. A method comprising:

receiving a request for a first resource and a hash key that is a hashed function of a first resource identifier;

retrieving said first resource and said first resource identifier from a data structure that is indexed by said hash key; and transmitting said first resource and said first resource identifier in response to said request for said first resource.

16. An apparatus comprising:

a receiver for receiving a request for a first resource and a hash key that is a hashed function of a first resource identifier;

a processor for retrieving said first resource and said first resource identifier from a data structure that is indexed by said hash key; and a transmitter for transmitting said first resource and said first resource identifier in response to said request for said first resource.

17. A method comprising:

receiving from a first processor a first resource identifier that identifies a first resource, a hash key that is a hashed function of said first resource identifier, and a request for a first resource;

retrieving a second resource and a second resource identifier from a data structure that is indexed by said hash key;

verifying that said second resource is said first resource by comparing said second resource identifier to said first resource identifier; and transmitting said second resource to said first processor when said second resource is verified as said first resource.

18. An apparatus comprising:

a receiver for receiving from a first processor a first resource identifier that identifies a first resource, a hash key that is a hashed function of said first resource identifier, and a request for a first resource;

a second processor for retrieving a second resource and a second resource identifier from a data structure that is indexed by said hash key, and for verifying that said second resource is said first resource by comparing said second resource identifier to said first resource identifier; and a transmitter for transmitting said second resource to said first processor when said second resource is verified as said first resource.

19. A method comprising:

hashing at a first processor a first resource identifier to create a hash key, wherein said first resource identifier identifies a first resource;

transmitting from said first processor to a second processor said hash key and a request for said first resource when said all or a portion of said hash key is contained in a list of valid hash keys associated with said first processor; and receiving at said first processor said first resource in response to the transmission of said hash key and said request for said first resource.

20. An apparatus comprising:

a first processor for hashing a first resource identifier to create a hash key, wherein said first resource identifier identifies a first resource, and for verifying that all or a portion of said hash key is contained in a list of valid hash keys;

a transmitter for transmitting from said first processor to a second processor said hash key and a request for said first resource; and a receiver for receiving said first resource in response to the transmission of said hash key and said request for said first resource.

21. A method comprising:

receiving from a first processor a request for a first resource and a first hash key that is a hashed function of a first resource identifier;

retrieving a second resource and a first portion of a second hash key from a data structure that is indexed by a first portion of said first hash key;

verifying that said second resource is said first resource by comparing a second portion of said first hash key to said first portion of said second hash key; and transmitting said second resource to said first processor when said second resource is verified as said first resource.

22. An apparatus comprising:

a receiver for receiving from a first processor a request for a first resource and a first hash key that is a hashed function of a first resource identifier;

a second processor for retrieving a second resource and a first portion of a second hash key from a data structure that is indexed by a first portion of said first hash key, and for verifying that said second resource is said first resource by comparing a second portion of said first hash key to said first portion of said second hash key; and a transmitter for transmitting said second resource to said first processor when said second resource is verified as said first resource.

* * * * *